(12) United States Patent
Lee

(10) Patent No.: US 10,614,355 B2
(45) Date of Patent: Apr. 7, 2020

(54) METHOD FOR UPDATING WEIGHTS OF SYNAPSES OF A NEUROMORPHIC DEVICE

(71) Applicant: SK hynix Inc., Icheon (KR)

(72) Inventor: Hyung-Dong Lee, Icheon (KR)

(73) Assignee: SK hynix Inc., Icheon (KR)

( * ) Notice: Subject to any disclaimer, the term of this patent is extended or adjusted under 35 U.S.C. 154(b) by 672 days.

(21) Appl. No.: 15/386,920

(22) Filed: Dec. 21, 2016

(65) Prior Publication Data

US 2017/0193363 A1     Jul. 6, 2017

Related U.S. Application Data

(60) Provisional application No. 62/273,281, filed on Dec. 30, 2015.

(30) Foreign Application Priority Data

Oct. 19, 2016  (KR) .................. 10-2016-0135640

(51) Int. Cl.
```
G06N 3/04      (2006.01)
G06N 3/063     (2006.01)
G06N 3/08      (2006.01)
```
(52) U.S. Cl.
CPC ............. *G06N 3/049* (2013.01); *G06N 3/063* (2013.01); *G06N 3/088* (2013.01)

(58) Field of Classification Search
CPC ....................................................... G06N 3/049
See application file for complete search history.

(56) References Cited

U.S. PATENT DOCUMENTS

| | | | |
|---|---|---|---|
| 6,023,422 A | 2/2000 | Allen et al. | |
| 9,396,431 B2* | 7/2016 | Bichler | ............... G06N 3/0635 |
| 2011/0119215 A1* | 5/2011 | Elmegreen | ............. G06N 3/063 |
| | | | 706/37 |
| 2014/0129498 A1* | 5/2014 | Bichler | .................. G06N 3/049 |
| | | | 706/25 |
| 2017/0083810 A1* | 3/2017 | Ielmini | .................. G06N 3/063 |

\* cited by examiner

*Primary Examiner* — Eric Nilsson
*Assistant Examiner* — Vasyl Dykyy

(57) ABSTRACT

A method for updating a weight of a synapse of a neuromorphic device is provided. The synapse may include a transistor and a memristor. The memristor may have a first electrode coupled to a source electrode of the transistor. The method may include inputting a row spike to a drain electrode of the transistor at a first time; inputting a column spike to a second electrode of the memristor at a second time; inputting a row pulse to the drain electrode of the transistor at a third time that is delayed by a first delay time from the second time; inputting a column pulse to the second electrode of the memristor at a fourth time that is delayed by a second delay time from the second time; and inputting a gating pulse to a gate electrode of the transistor at a fifth time that is delayed by a third delay time from the fourth time.

20 Claims, 12 Drawing Sheets

(A)

(B)

(C)

(D)

METHOD FOR UPDATING WEIGHTS OF SYNAPSES OF A NEUROMORPHIC DEVICE

CROSS-REFERENCE TO RELATED APPLICATION

The present application claims priority to U.S. Provisional Patent Application No. 62/273,281, filed on Dec. 30, 2015, and Korean Patent Application No. 10-2016-0135640, filed on Oct. 19, 2016, which are incorporated herein by reference in their entirety.

TECHNICAL FIELD

Exemplary embodiments of the present disclosure relate to methods for updating (potentiating or depressing) weights of synapses of a neuromorphic device.

DISCUSSION OF THE RELATED ART

Recently, much attention has been paid to neuromorphic technology, which uses chips that mimic the human brain. A neuromorphic device based on the neuromorphic technology includes a plurality of pre-synaptic neurons, a plurality of post-synaptic neurons, and a plurality of synapses. The neuromorphic device outputs pulses or spikes having various levels, magnitudes, or times, according to learning states of the neuromorphic device. As a method for updating weights of synapses of a neuromorphic device, an STDP (spike-time-dependent plasticity) method has been suggested. According to the STDP method, pulses are generated from pre-synaptic neurons and post-synaptic neurons, and weights of synapses are updated according to overlapping areas of the pulses. In order to implement this STDP method, a TDM (time division multiplexing) method and a method of using a plurality of memristors have been suggested. The TDM method uses a plurality of timing cycles that are synchronized with a global clock. However, since the TDM method requires a lengthy period, an update speed is very slow. In addition, since, in the method using the plurality of memristors, all the memristors should operate normally, update stability is low.

SUMMARY

Various embodiments are directed to methods for updating weights of synapses of a neuromorphic device.

Various embodiments are directed to methods capable of potentiating or depressing weights of synapses of a neuromorphic device in a short time.

Various embodiments are directed to methods capable of effectively controlling potentiation ratios or depression ratios of synapses of a neuromorphic device.

Various objects to be achieved by the present disclosure are not limited to the aforementioned objects, and those skilled in the art to which the present disclosure pertains may clearly understand other objects from the following descriptions.

In an embodiment, a method for updating a weight of a synapse of a neuromorphic device, the synapse including a transistor and a memristor, the memristor having a first electrode coupled to a source electrode of the transistor, may include: inputting a row spike to a drain electrode of the transistor at a first time; inputting a column spike to a second electrode of the memristor at a second time; inputting a row pulse to the drain electrode of the transistor at a third time that is delayed by a first delay time from the second time; inputting a column pulse to the second electrode of the memristor at a fourth time that is delayed by a second delay time from the second time; and inputting a gating pulse to a gate electrode of the transistor at a fifth time that is delayed by a third delay time from the fourth time.

The row spike may be generated by a pre-synaptic neuron and may be inputted to the drain electrode of the transistor through a row line.

The column spike may be generated by a post-synaptic neuron and may be inputted to the second electrode of the memristor through a column line.

The row pulse may be generated by the pre-synaptic neuron and may be inputted to the drain electrode of the transistor through a row line.

The column pulse may be generated from the post-synaptic neuron and may be inputted to the second electrode of the memristor through a column line.

The row spike and the column spike may be generated while a gating signal is inputted to the gate electrode of the transistor.

The gating signal may be generated by a gating controller and may be inputted to the gate electrode of the transistor through a gating line.

Updating of the weight of the synapse may be performed for a time period in which an overlay of the row pulse and the column pulse overlaps the gating pulse.

In an embodiment, a method for updating a weight of a synapse of a neuromorphic device may include: inputting, by a first neuron, a first spike to a first synapse at a first time; inputting, by a second neuron, a second spike to a second synapse at a second time that is delayed from the first time; inputting, by a third neuron, a third spike to each of the first synapse and the second synapse at a third time; inputting, by the first neuron, a first pulse to the first synapse at a fourth time that is delayed from the third time; inputting, by the second neuron, a second pulse to the second synapse at a fifth time that is delayed from the third time; inputting, by the third neuron, a third pulse to each of the first synapse and the second synapse at a sixth time; inputting a first gating pulse to the first synapse at a seventh time; and inputting a second gating pulse to the second synapse at an eighth time.

If a first spike time difference from the first time to the third time is shorter than a second spike time difference from the second time to the third time, a first gating time difference from the sixth time to the seventh time may be shorter than a second gating time difference from the sixth time to the eight time.

If the first gating time difference is shorter than the second gating time difference, a weight of the first synapse may be updated over a longer time period than a weight of the second synapse.

The first synapse may include a first transistor and a first memristor, the second memristor having a first electrode coupled to a source electrode of the first transistor. The second synapse may include a second transistor and a second memristor which has a first electrode coupled to a source electrode of the second transistor. The first neuron may be coupled to a drain electrode of the first transistor. The second neuron may be coupled to a drain electrode. The third neuron may be coupled to a second electrode of the first memristor and a second electrode of the second memristor.

The first gating pulse may be generated by a first gating controller that is coupled to a gate electrode of the first transistor. The second gating pulse may be generated by a second gating controller that is coupled to a gate electrode of the second transistor.

The first and second neurons may be first and second pre-synaptic neurons. The third neuron may be a post-synaptic neuron. The first and second synapses may be coupled in common to the post-synaptic neuron.

The first and second neurons may be first and second post-synaptic neurons. The third neuron may be a pre-synaptic neuron. The first and second synapses may be coupled in common to the pre-synaptic neuron.

In an embodiment, a method for updating weights of first and second synapses of a neuromorphic device, the first synapse including a first transistor and a first memristor, the first memristor having a first electrode coupled to a source electrode of the first transistor, the second synapse including a second transistor and a second memristor, the second memristor having a first electrode coupled to a source electrode of the second transistor may include: turning on the first transistor and the second transistor by inputting a first gating signal to a gate electrode of the first transistor and inputting a second gating signal to a gate electrode of the second transistor, the gating signal being generated by a first gating controller, the second gating signal being generated by a second gating controller; inputting a first row spike, to a drain electrode of the first transistor of the first synapse through a first row line, and inputting a second row spike to a drain electrode of the second transistor of the second synapse through a second row line, the first row spike being generated by a first pre-synaptic neuron coupled to the first synapse, the second row spike being generated by a second pre-synaptic neuron coupled to the second synapse; inputting a column spike generated by a post-synaptic neuron, which is coupled in common to the first synapse and the second synapse, to a second electrode of the first memristor and a second electrode of the second memristor through a column line; stopping the first and second gating signals from being input to thereby turn off the first transistor and the second transistor; inputting a first row pulse to the drain electrode of the first transistor and inputting a second row pulse to the drain electrode of the second transistor, the first row pulse being generated by the first pre-synaptic neuron, the second row pulse being generated by the second pre-synaptic neuron; inputting a column pulse to the second electrode of the first memristor and the second electrode of the second memristor, the column pulse being generated by the post-synaptic neuron; and inputting a first gating pulse to the gate electrode of the first transistor and inputting a second gating pulse to the gate electrode of the second transistor such that the first and second transistors are turned on in response to the first and second gating pulses, respectively, the first gating pulse being generated by the first gating controller, the second gating pulse being generated by the second gating controller.

If a first spike time difference from a time when the first row spike is generated to a time when the column spike is generated is shorter than a second spike time difference from a time when the second row spike is generated to the time when the column spike is generated, a first gating time difference from a time when the column pulse is generated to a time when the first gating pulse is generated may be shorter than a second gating time difference from the time when the column pulse is generated to a time when the second gating pulse is generated.

If the first spike time difference may be longer than the second spike time difference, the first gating time difference may be longer than the second gating time difference.

The column pulse may have a negative (−) voltage when the first and second row pulses have a positive (+) voltage.

The column pulse may have a positive (+) voltage when the first and second row pulses have a negative (−) voltage.

The details of other embodiments are included in the detailed description and the drawings.

DETAILED DESCRIPTION

Figure 1A:
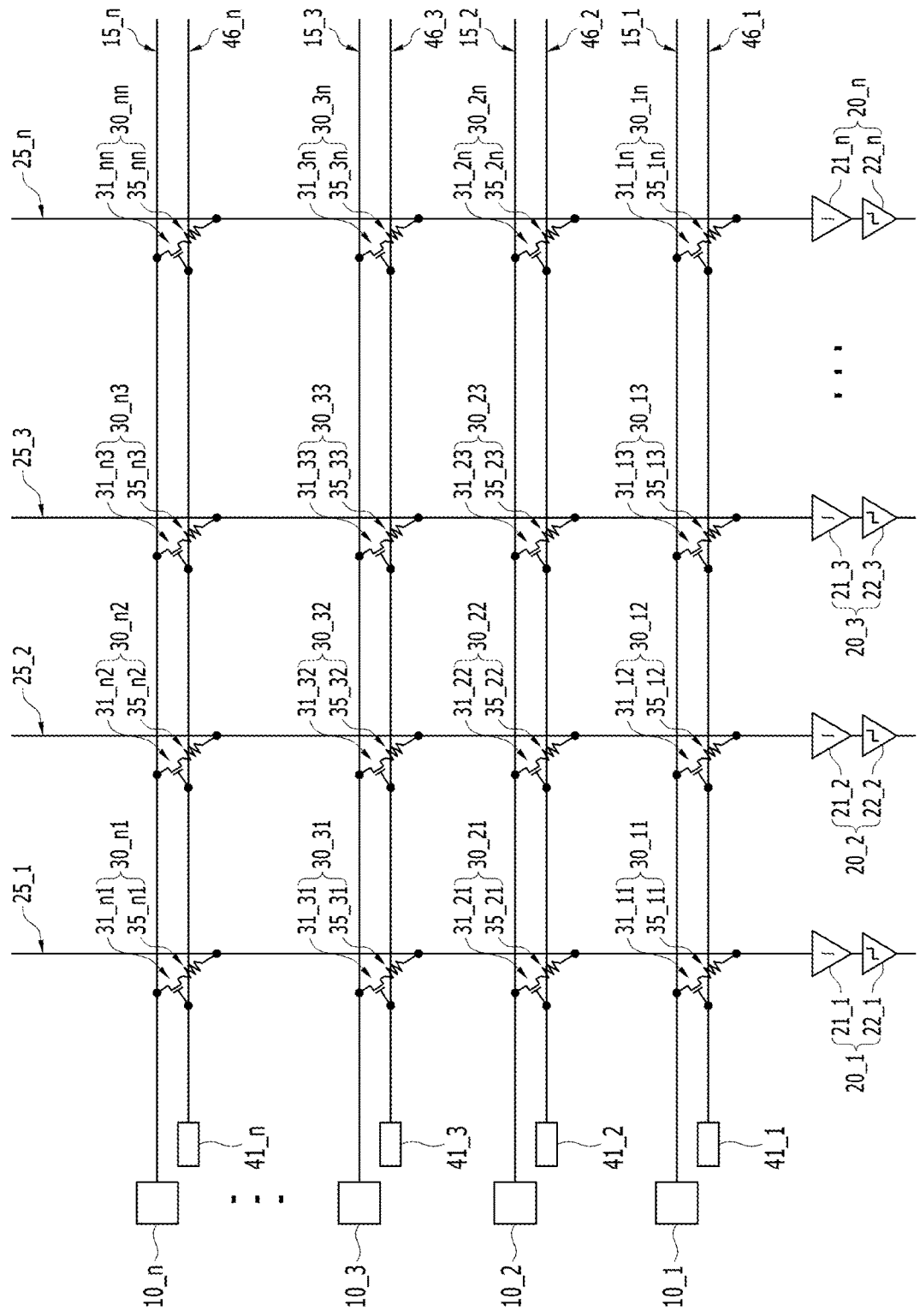
FIGS. 1A to 1C are block diagrams conceptually illustrating neuromorphic devices in accordance with various embodiments of the present disclosure.

In the present disclosure, advantages, features, and methods for achieving them will become more apparent after a reading of the following exemplary embodiments taken in conjunction with the drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Terms used in this specification are used for describing various embodiments, and do not limit the present invention. As used herein, a singular form is intended to include plural forms as well, unless the context clearly indicates otherwise. It will be further understood that the terms 'includes' and/or 'including,' when used in this specification, specify the presence of at least one stated feature, step, operation, and/or element, but do not preclude the presence or addition of one or more other features, steps, operations, and/or elements thereof.

When one element is referred to as being 'connected to' or 'coupled to' another element, it may indicate that the former element is directly connected or coupled to the latter element or another element is interposed therebetween. On the other hand, when one element is referred to as being 'directly connected to' or 'directly coupled to' another element, it may indicate that no element is interposed therebetween. Furthermore, 'and/or' includes each of described items and one or more combinations.

The terms such as 'below,' 'beneath,' 'lower,' 'above,' and 'upper,' which are spatially relative terms, may be used to describe the correlation between one element or components and another element or other components, as illustrated in the drawings. The spatially relative terms should be understood as terms including different directions of elements during the use or operation, in addition to the directions illustrated in the drawings. For example, when an element illustrated in a drawing is turned over, the element which is referred to as being 'below' or 'beneath' another element may be positioned above another element.

Throughout the specification, like reference numerals refer to like elements. Therefore, although the same or similar reference numerals are not mentioned or described in a corresponding drawing, the reference numerals may be described with reference to other drawings. Furthermore, although elements are not represented by reference numerals, the elements may be described with reference to other drawings.

In this specification, 'potentiation,' 'set,' 'learning,' and 'training' may be used as the same or similar terms, and 'depressing,' 'reset,' and 'initiation' may be used as the same or similar terms. For example, an operation of lowering resistance values of synapses may be exemplified as potentiation, setting, learning, or training, and an operation of raising resistance values of synapses may be exemplified as depressing, resetting, or initiation. Furthermore, when a synapse is potentiated, set, or trained, a gradually increasing voltage/current may be outputted from the synapse because the conductivity thereof is increasing. When a synapse is depressed, reset, or initiated, a gradually decreasing voltage/current may be outputted from the synapse because the conductivity thereof is decreasing. For convenience of description, a data pattern, an electrical signal, a pulse, a spike, and a firing may be interpreted as having the same, similar, or a compatible meaning. Furthermore, a voltage and a current may also be interpreted as having the same or a compatible meaning.

Figure 1B:
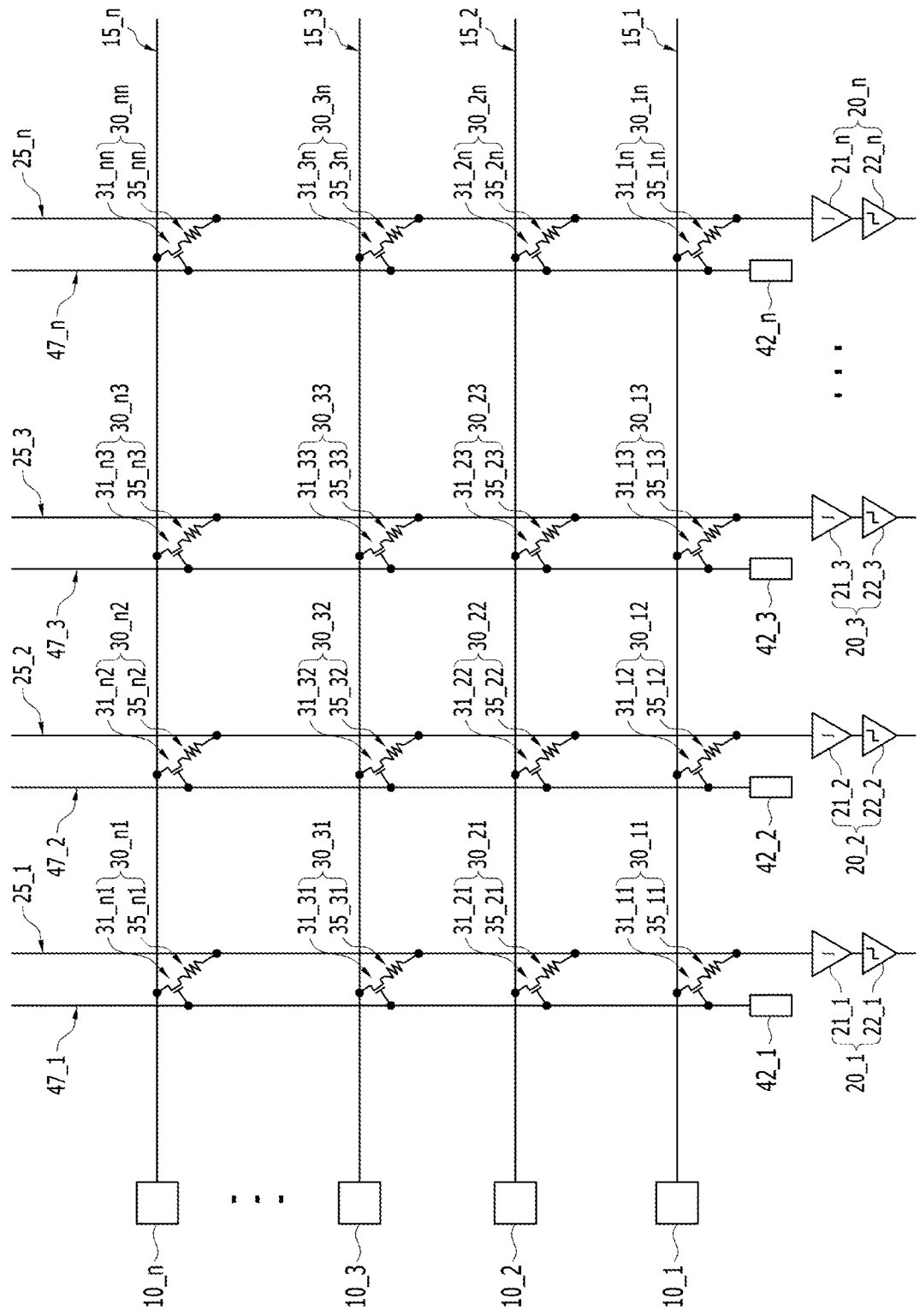
Figure 1C:
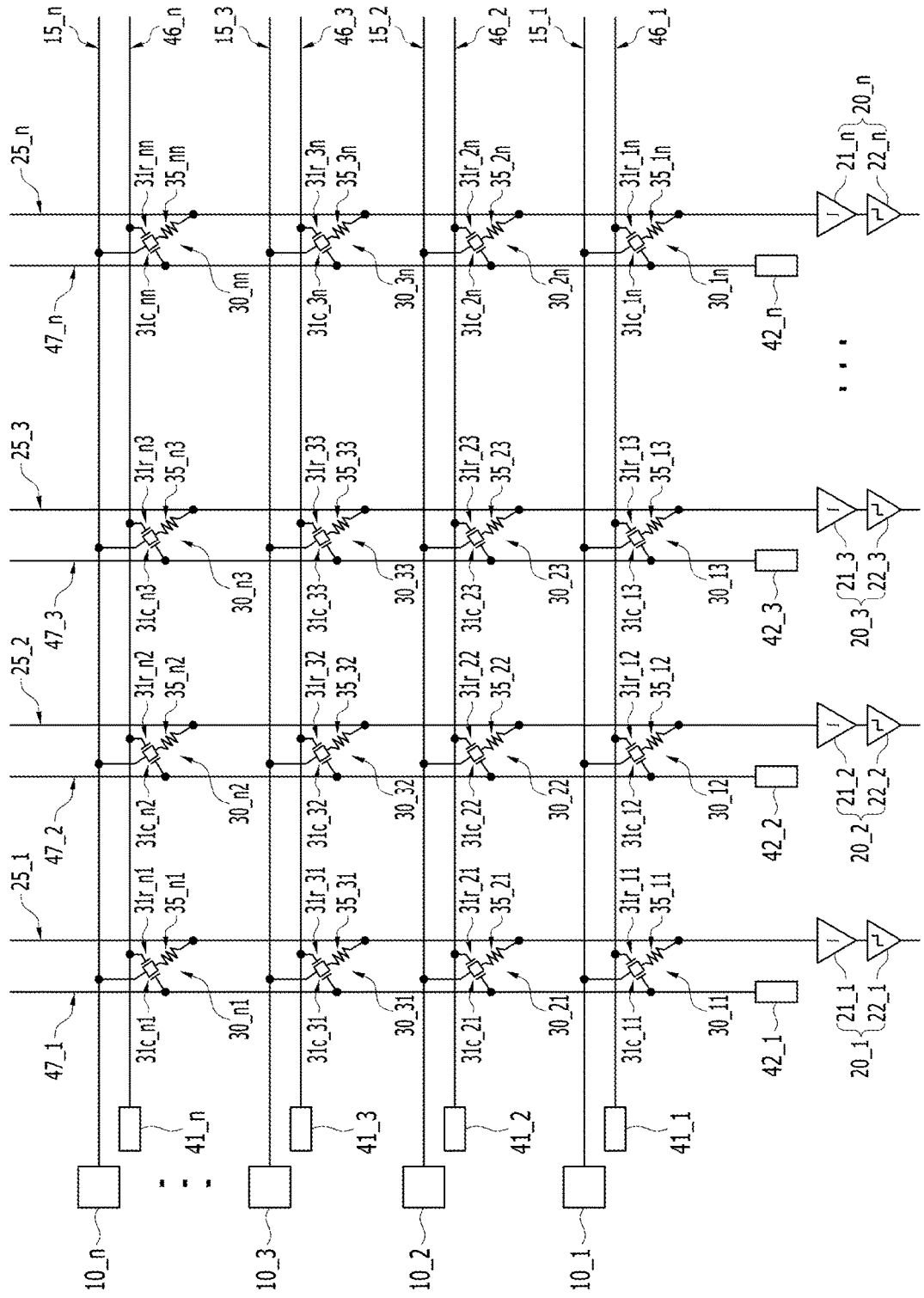

FIGS. 1A to 1C are block diagrams conceptually illustrating neuromorphic devices in accordance with various embodiments of the present disclosure.

Referring to FIG. 1A, a neuromorphic device in accordance with an embodiment may include a plurality of pre-synaptic neurons $10\_1$ to $10\_n$, row lines $15\_1$ to $15\_n$, a plurality of post-synaptic neurons $20\_1$ to $20\_n$, column lines $25\_1$ to $25\_n$, a plurality of synapses $30\_11$ to $30\_nn$, a plurality of row gating controllers $41\_1$ to $41\_n$, and row gating lines $46\_1$ to $46\_n$, n being a positive integer. In this embodiment, the number of pre-synaptic neurons $10\_1$ to $10\_n$ is the same as the number of post-synaptic neurons $20\_1$ to $20\_n$. However, in another embodiment, the number of pre-synaptic neurons may be different from the number of post-synaptic neurons, and the numbers of other components may be determined depending on the number of pre-synaptic neurons and the number of post-synaptic neurons.

The respective synapses $30\_11$ to $30\_nn$ may include transistors $31\_11$ to $31\_nn$ and memristors $35\_11$ to $35\_nn$. The respective post-synaptic neurons $20\_1$ to $20\_n$ may include integrators $21\_1$ to $21\_n$ and comparators $22\_1$ to $22\_n$. The row lines $15\_1$ to $15\_n$ may be arranged in parallel with the row gating lines $46\_1$ to $46\_n$, respectively.

Gate electrodes of the transistors $31\_11$ to $31\_nn$ in the synapses $30\_11$ to $30\_nn$ may be electrically coupled to the row gating controllers $41\_1$ to $41\_n$ through the row gating lines $46\_1$ to $46\_n$, drain electrodes of the transistors $31\_11$ to $31\_nn$ may be electrically coupled to the pre-synaptic neurons $10\_1$ to $10\_n$ through the row lines $15\_1$ to $15\_n$, and source electrodes of the transistors $31\_11$ to $31\_nn$ may be electrically coupled to first electrodes of the memristors $35\_11$ to $35\_nn$, respectively. Second electrodes of the memristors $35\_11$ to $35\_nn$ may be electrically coupled to the post-synaptic neurons $20\_1$ to $20\_n$ through the column lines $25\_1$ to $25\_n$.

Input terminals of the integrators $21\_1$ to $21\_n$ in the post-synaptic neurons $20\_1$ to $20\_n$ may be electrically coupled to the second electrodes of the memristors $35\_11$ to $35\_nn$ through the column lines $25\_1$ to $25\_n$, and input terminals of the comparators $22\_1$ to $22\_n$ may be electrically coupled to output terminals of the integrators $21\_1$ to $21\_n$, respectively.

The pre-synaptic neurons $10\_1$ to $10\_n$ may transmit electrical signals to the synapses $30\_11$ to $30\_nn$ through the row lines $15\_1$ to $15\_n$ in a learning mode, a reset mode, or a reading mode.

The post-synaptic neurons $20\_1$ to $20\_n$ may transmit electrical signals to the synapses $30\_11$ to $30\_nn$ through the column lines $25\_1$ to $25\_n$ in the learning mode or the reset mode, and may receive electrical signals from the synapses $30\_11$ to $30\_nn$ through the column lines $25\_1$ to $25\_n$ in the reading mode.

The respective row lines $15\_1$ to $15\_n$ may extend from the respective pre-synaptic neurons $10\_1$ to $10\_n$ in a row direction, and the row lines $15\_1$ to $15\_n$ may be electrically coupled to the plurality of synapses $30\_11$ to $30\_nn$.

The respective column lines $25\_1$ to $25\_n$ may extend from the respective post-synaptic neurons $20\_1$ to $20\_n$ in a column direction, and the column lines $25\_1$ to $25\_n$ may be electrically coupled to the plurality of synapses $30\_11$ to $30\_nn$.

The row gating controllers $41\_1$ to $41\_n$ may provide gating signals to the synapses $30\_11$ to $30\_nn$ through the row gating lines $46\_1$ to $46\_n$.

The respective row gating lines $46\_1$ to $46\_n$ may extend from the respective row gating controllers $41\_1$ to $41\_n$ in the row direction, and the row gating lines $46\_1$ to $46\_n$ may be electrically coupled to the plurality of synapses $30\_11$ to $30\_nn$.

The synapses $30\_11$ to $30\_nn$ may be disposed in intersection regions of the row lines $15\_1$ to $15\_n$ and the column lines $25\_1$ to $25\_n$. Synapses that share the same row line may share the same row gating line. For example, the synapses $30\_11$ to $30\_1n$ sharing the same row line $15\_1$ share the same row gating line $46\_1$.

Referring to FIG. 1B, a neuromorphic device in accordance with an embodiment may include a plurality of pre-synaptic neurons $10\_1$ to $10\_n$, row lines $15\_1$ to $15\_n$, a plurality of post-synaptic neurons $20\_1$ to $20\_n$, column lines $25\_1$ to $25\_n$, a plurality of synapses $30\_11$ to $30\_nn$, a plurality of column gating controllers $42\_1$ to $42\_n$, and column gating lines $47\_1$ to $47\_n$. The column gating controllers $42\_1$ to $42\_n$ may provide gating signals to the synapses $30\_11$ to $30\_nn$ through the column gating lines $47\_1$ to $47\_n$. The respective column gating lines $47\_1$ to $47\_n$ may extend from the respective column gating controllers $42\_1$ to $42\_n$ in the column direction, and the column gating lines $47\_1$ to $47\_n$ may be electrically coupled to the plurality of synapses $30\_11$ to $30\_nn$. Synapses that share the same column line may share the same column gating line. For example, the synapses $30\_11$ to $30\_n1$ sharing the same column line $25\_1$ also share the same column gating line $47\_1$.

Gate electrodes of transistors $31\_11$ to $31\_nn$ in the synapses $30\_11$ to $30\_nn$ may be electrically coupled to the column gating controllers $42\_1$ to $42\_n$ through the column gating lines 47_1 to 47_n, drain electrodes of the transistors 31_11 to 31_nn may be electrically coupled to the pre-synaptic neurons 10_1 to 10_n through the row lines 15_1 to 15_n, and source electrodes of the transistors 31_11 to 31_nn may be electrically coupled to first electrodes of memristors 35_11 to 35_nn in the synapses 30_11 to 30_nn.

Referring to FIG. 1C, a neuromorphic device in accordance with an embodiment may include a plurality of pre-synaptic neurons 10_1 to 10_n, row lines 15_1 to 15_n, a plurality of post-synaptic neurons 20_1 to 20_n, column lines 25_1 to 25_n, a plurality of synapses 30_11 to 30_nn, a plurality of row gating controllers 41_1 to 41_n, a plurality of column gating controllers 42_1 to 42_n, row gating lines 46_1 to 46_n, and column gating lines 47_1 to 47_n. The row gating controllers 41_1 to 41_n may provide gating signals to the synapses 30_11 to 30_nn through the row gating lines 46_1 to 46_n, and the column gating controllers 42_1 to 42_n may provide gating signals to the synapses 30_11 to 30_nn through the column gating lines 47_1 to 47_n. Synapses sharing the same row line may also share the same row gating line. Synapses sharing the same column line may also share the same column gating line. That is to say, the respective synapses 30_11 to 30_nn may be electrically coupled to the respective ones of the row lines 15_1 to 15_n, the respective ones of the column lines 25_1 to 25_n, the respective ones of the row gating lines 46_1 to 46_n, and the respective ones of the column gating lines 47_1 to 47_n. For example, the synapse 30_11 is electrically coupled to the row line 15_1, the column line 25_1, the row gating line 46_1, and the column gating line 47_1.

The synapses 30_11 to 30_nn may include row transistors 31r_11 to 31r_nn, column transistors 31c_11 to 31c_nn, and memristors 35_11 to 35_nn. Gate electrodes of the row transistors 31r_11 to 31r_nn may be electrically coupled to the row gating controllers 41_1 to 41_n through the row gating lines 46_1 to 46_n, and gate electrodes of the column transistors 31c_11 to 31c_nn may be electrically coupled to the column gating controllers 42_1 to 42_n through the column gating lines 47_1 to 47_n. Drain electrodes of the row transistors 31r_11 to 31r_nn and drain electrodes of the column transistors 31c_11 to 31c_nn may be electrically coupled to the pre-synaptic neurons 10_1 to 10_n through the row lines 15_1 to 15_n, and source electrodes of the row transistors 31r_11 to 31r_nn and source electrodes of the column transistors 31c_11 to 31c_nn may be electrically coupled to first electrodes of the memristors 35_11 to 35_nn.

Figure 2A:
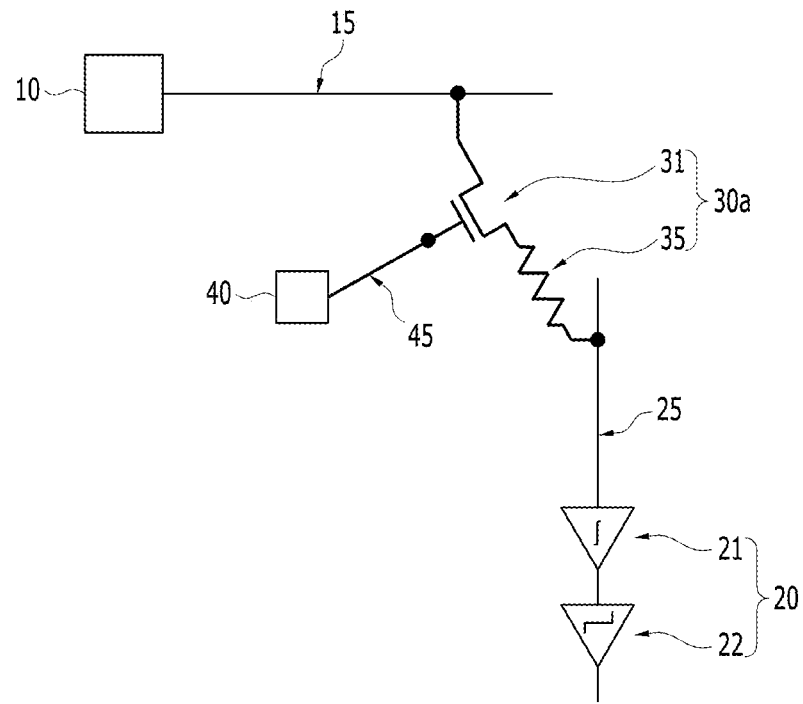
FIGS. 2A and 2B are block diagrams illustrating portions of neuromorphic devices in accordance with embodiments of the present disclosure.
Figure 2B:
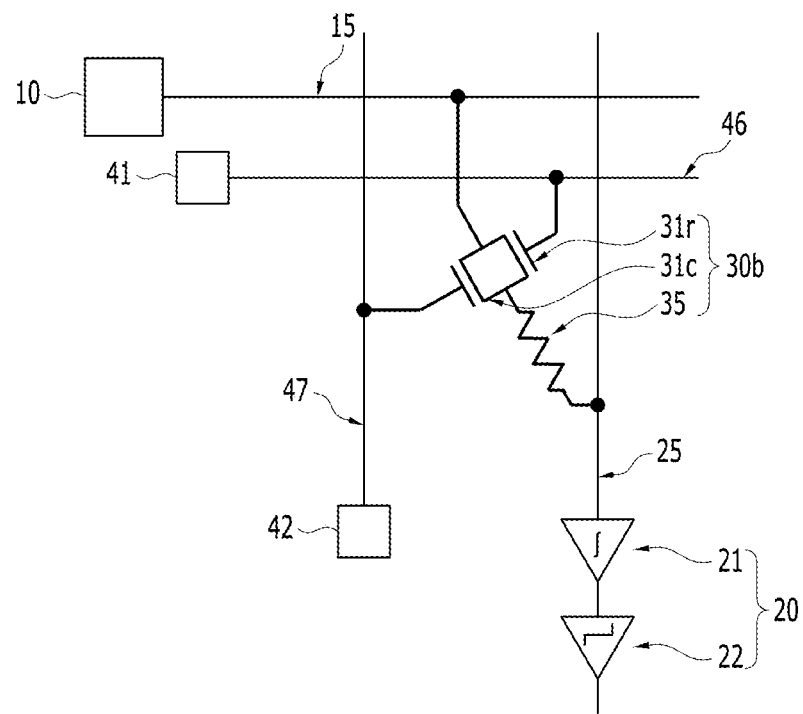

FIGS. 2A and 2B are block diagrams illustrating portions of neuromorphic devices in accordance with embodiments of the present disclosure.

Referring to FIG. 2A, a synapse 30a may include a transistor 31 and a memristor 35, and a post-synaptic neuron 20 may include an integrator 21 and a comparator 22. A gate electrode of the transistor 31 in the synapse 30a may be electrically coupled to a gating controller 40 through a gating line 45, a drain electrode of the transistor 31 may be electrically coupled to a pre-synaptic neuron 10 through a row line 15, and a source electrode of the transistor 31 may be electrically coupled to a first electrode of the memristor 35. A second electrode of the memristor 35 may be electrically coupled to the post-synaptic neuron 20 through a column line 25.

When referring additionally to FIGS. 1A and 1B, the gating controller 40 may be one of the row gating controller 41_k and the column gating controller 42_k, k being in a range of 1 to n, and the gating line 45 may be one of the row gating line 46_k and the column gating line 47_k. An input terminal of the integrator 21 in the post-synaptic neuron 20 may be electrically coupled to the second electrode of the memristor 35 through the column line 25, and an input terminal of the comparator 22 may be electrically coupled to an output terminal of the integrator 21.

Referring to FIG. 2B, a synapse 30b may include a row transistor 31r, a column transistor 31c, and a memristor 35; and a post-synaptic neuron 20 may include an integrator 21 and a comparator 22. Accordingly, the synapse 30b may electrically operate when at least one of the row transistor 31r and the column transistor 31c is turned on in response to at least one of gating signals provided by a gating controller 41 and a gating controller 42. When referring additionally to FIG. 1C, the gating controller 41 may be one of the row gating controllers 41_1 to 41_n, and the gating controller 42 may be one of the column gating controllers 42_1 to 42_n.

Figure 3A:
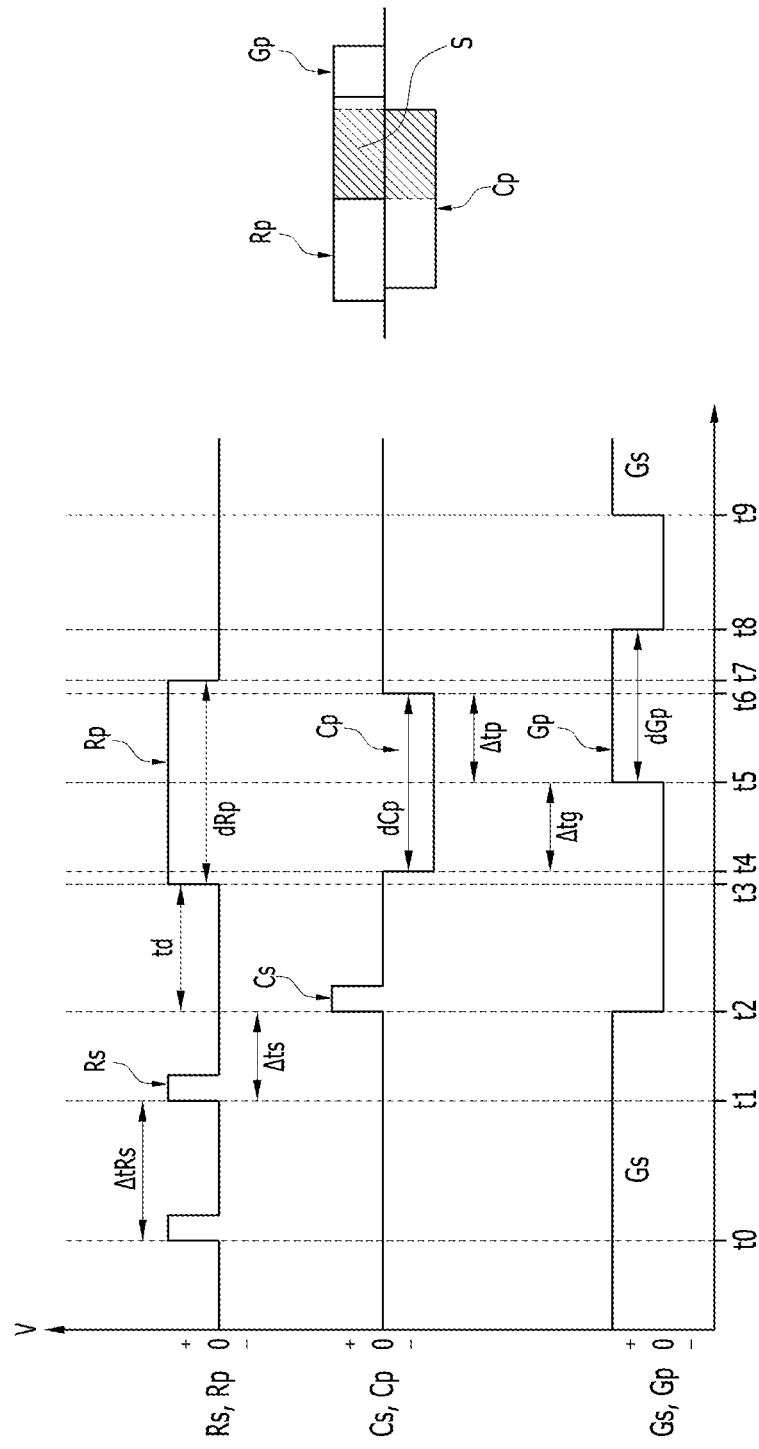
FIG. 3A is a timing diagram illustrating a method for potentiating a synapse of the neuromorphic device shown in FIG. 2A.
Figure 3B:
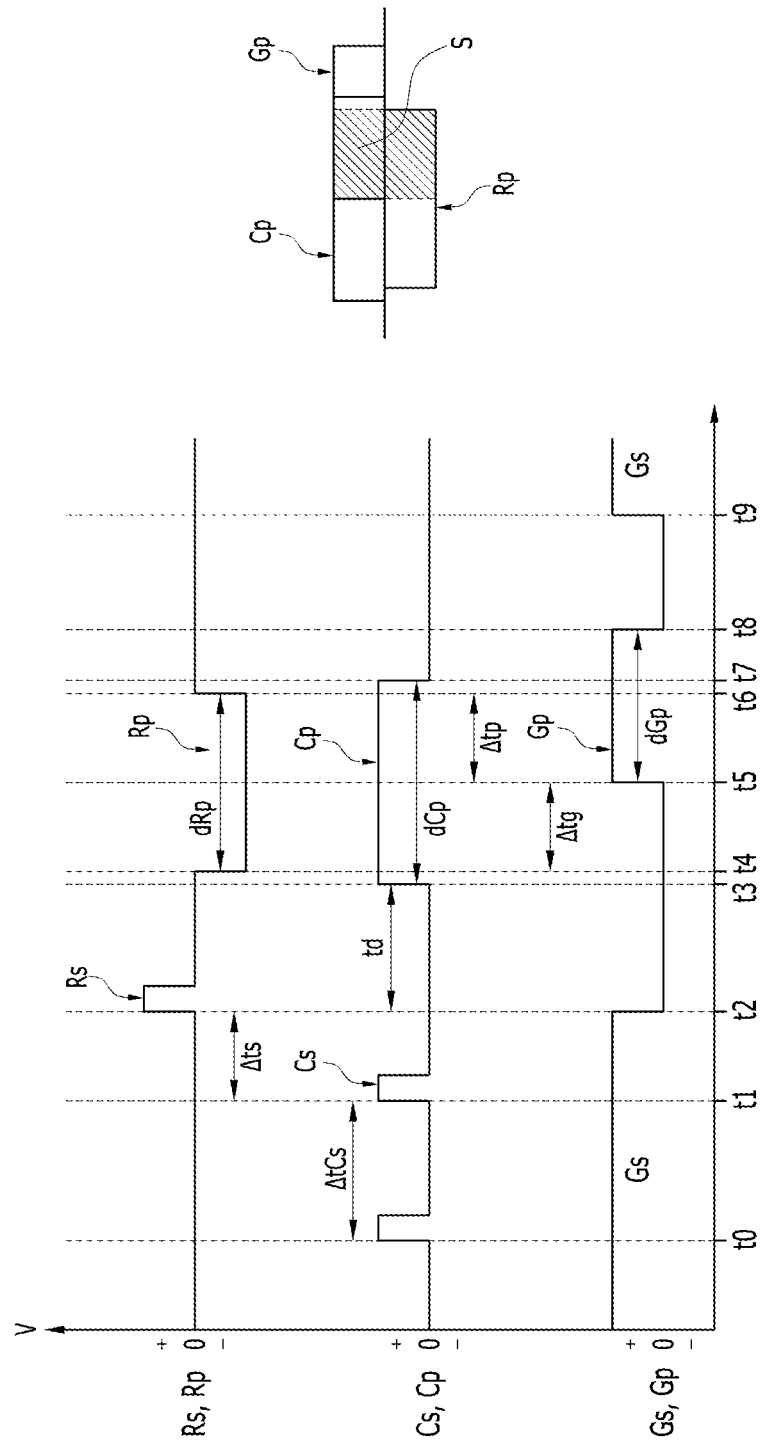
FIG. 3B is a timing diagram illustrating a method for depressing the synapse of the neuromorphic device shown in FIG. 2A.

FIG. 3A is a timing diagram illustrating a method for potentiating the synapse 30a of the neuromorphic device shown in FIG. 2A, and FIG. 3B is a timing diagram illustrating a method for depressing the synapse 30a of the neuromorphic device shown in FIG. 2A. By potentiating and depressing the synapse 30a, a learned data pattern, i.e., a weight, of the synapse 30a can be updated.

Referring to FIGS. 2A and 3A, the method for potentiating the synapse 30a of the neuromorphic device in accordance with an embodiment of the present disclosure may include inputting a plurality of row spikes Rs to the drain electrode of the transistor 31 in the synapse 30 from the pre-synaptic neuron 10 through the row line 15 while the transistor 31 is turned on, that is, when a gating signal Gs is inputted to the gate electrode of the transistor 31. Descriptions will be made on the assumption that the last row spike Rs among the row spikes Rs inputted to the drain electrode of the transistor 31 rises at a first time t1. In other words, a rising edge of the last row spike Rs may be positioned at the first time t1. In another embodiment of the present disclosure, it may be assumed that the last row spike Rs falls at the first time t1. In other words, a falling edge of the last row spike Rs may be positioned at the first time t1.

The method may further include generating, by the post-synaptic neuron 20, a column spike Cs for selecting the synapse 30a to be potentiated. In other words, the method may include generating the column spike Cs by the post-synaptic neuron 20 at a second time t2 after the plurality of row spikes Rs are accumulated. For example, as the row spikes Rs are accumulated, if a voltage/current value integrated in the integrator 21 of the post-synaptic neuron 20 becomes higher than a reference voltage of the comparator 22, the post-synaptic neuron 20 may be fired. The second time t2 when the column spike Cs is generated may have a spike time difference Δts with the first time t1 when the last row spike Rs is generated (Δts=t2−t1). In some embodiments of the present disclosure, the spike time difference Δts may be a time difference between a time when the last row spike Rs disappears (a falling time) and a time when the column spike Cs is generated.

The method may further include stopping the gating controller 40 from providing the gating signal Gs to the gate electrode of the transistor 31 at the second time t2 when the column spike Cs is generated. In other words, the transistor 31 of the synapse 30a may be turned off at the second time t2. Further, the method may include stopping generation of the row spike Rs when the column spike Cs is generated. The spike time difference Δts may be shorter than a time interval ΔtRs between two row spikes Rs, e.g., a time interval between generation times of sequentially generated two row spikes Rs. Accordingly, no row spike Rs may be generated between the last row spike Rs and the column spike Cs.

The method may further include generating a row pulse Rp by the pre-synaptic neuron 10 at a third time t3 that is delayed by a delay time td from the second time t2 when the column spike Cs is generated. That is, the row pulse Rp for potentiating the synapse 30a may be inputted at the third time t3 to the drain electrode of the transistor 31 in the synapse 30a from the pre-synaptic neuron 10. For example, the row pulse Rp may have a positive (+) voltage +Vset/2, which is equal to or larger than ½ of a set voltage Vset.

The method may further include generating a column pulse Cp for potentiating the synapse 30a by the post-synaptic neuron 20 at a fourth time t4 that is delayed by a slight delay time from the third time t3. In other words, the method may include inputting the column pulse Cp for potentiating the synapse 30a to the second electrode of the memristor 35 in the synapse 30a from the post-synaptic neuron 20 at the fourth time t4. The column pulse Cp may have a negative (−) voltage −Vset/2, which has a magnitude that is equal to or larger than ½ of the set voltage Vset. Even though the column pulse Cp does not have a negative (−) voltage, if a voltage difference between the row pulse Rp and the column pulse Cp is larger than the set voltage Vset, a current may flow from the drain electrode of the transistor 31 in the synapse 30 to the second electrode of the memristor 35. Therefore, a resistance value of the memristor 35 in the synapse 30 may decrease, and the synapse 30a may be potentiated.

The row pulse Rp and the column pulse Cp may mostly overlap. However, a duration dRp of the row pulse Rp may be longer than a duration dCp of the column pulse Cp. In the embodiment shown in FIG. 3A, it is illustrated that the row pulse Rp rises earlier than the column pulse Cp and falls later than the column pulse Cp. The row pulse Rp and the column pulse Cp may rise/fall and fall/rise at substantially the same times. In some embodiments of the present disclosure, the row pulse Rp and the column pulse Cp may overlap in a variety of ways. In another embodiment, the row pulse Rp may rise later and fall earlier than the column pulse Cp. That is, the duration dCp of the column pulse Cp may be longer than the duration dRp of the row pulse Rp.

The method may further include generating a gating pulse Gp by the gating controller 40 at a fifth time t5 after the column pulse Cp is generated at the fourth time t4, the fifth time t5 being a gating time difference Δtg from the fourth time t4 when the column pulse Cp is generated and inputted to the synapse 30a. Namely, the gating pulse Gp generated by the gating controller 40 may be inputted to the gate electrode of the transistor 31 in the synapse 30a through the gating line 45 at the fifth time t5. The gating pulse Gp has a duration dGp that is longer than the gating time difference Δtg. The gating pulse Gp falls at an eighth time t8 that is later than a seventh time t7, which is when the row pulse Rp falls. In the present embodiment, it may be assumed that the gating pulse Gp and the row pulse Rp have the same maximum voltage level and the same rectangular shape.

If the transistor 31 is turned on as the gating pulse Gp is inputted to the gate electrode of the transistor 31, the memristor 35 in the synapse 30a may be potentiated during a time period when the gating pulse Gp, the row pulse Rp, and the column pulse Cp overlap, that is, during a potentiation time Δtp=t6−t5, in which t6 represents a time when the column pulse Cp ends. In other words, while both the row pulse Rp, the column pulse Cp and the gating pulse Gp are inputted to the synapse 30a, i.e., in an overlay region S of the row pulse Rp, the column pulse Cp and the gating pulse Gp, the transistor 31 is turned on, and thus the memristor 35 is potentiated. That is, STDP (spike-timing-dependent plasticity) technology may be implemented simply and effectively within a shorter time than the existing TDM (time division multiplexing) technology. Further, since only one memristor is included in a synapse, a synapse error by non-uniformity of memristors may be substantially reduced compared to a synapse including a plurality of memristors.

If the inputting of the column pulse Cp and the row pulse Rp is ended, and thus potentiation of the synapse 30a is ended, the inputting of the gating pulse Gp may be ended as well. Thereafter, as the gating signal Gs for a next cycle is inputted at a ninth time t9 to a gate electrode of a transistor in another synapse, a ready state for potentiating or depressing the other synapse may be entered.

The above operation described with reference to FIGS. 2A and 3A may be applied to the synapse 30b illustrated in FIG. 2B when one of the row transistor 31r and the column transistor 31c receives the gating signal Gp and is turned on to potentiate the synapse 30b.

Referring to FIGS. 2A and 3B, a method for depressing the synapse 30a of the neuromorphic device in accordance with an embodiment of the present disclosure may include inputting a plurality of column spikes Cs to the second electrode of the memristor 35 in the synapse 30 from the post-synaptic neuron 20 through the column line 25 while the transistor 31 is turned on, that is, when a gating signal Gs is inputted to the gate electrode of the transistor 31. Descriptions will be made on the assumption that the last column spike Cs, among the column spikes Cs inputted to the second electrode of the memristor 35, rises at a first time t1. In other words, a rising edge of the last column spike Cs may be positioned at the first time t1. In another embodiment of the present disclosure, it may be assumed that the last column spike Cs falls at the first time t1. In other words, a falling edge of the last column spike Cs may be positioned at the first time t1.

The method may further include generating, by the pre-synaptic neuron 10, a row spike Rs for selecting the synapse 30a to be depressed. In other words, the method may include generating the row spike Rs by the pre-synaptic neuron 10 at a second time t2 after the plurality of column spikes Cs are accumulated. For example, the pre-synaptic neuron 10 may be fired when the column spikes Cs are accumulated. The second time t2 may have a spike time difference Δts with the first time t1 (Δts=t2−t1).

The method may further include stopping the gating controller 40 from providing the gating signal Gs to the gate electrode of the transistor 31 at the second time t2 when the row spike Rs is generated. Namely, the transistor 31 in the synapse 30a may be turned off at the second time t2. Further, the method may include stopping the generation of the column spike Cs when the row spike Rs is generated. The spike time difference Ms may be shorter than a time interval ΔtCs between two column spikes Cs, e.g., a time interval between generation times of sequentially generated two column spikes Cs. Accordingly, no column spike Cs may be generated between the last column spike Cs and the row spike Rs.

The method may further include generating a column pulse Cp by the post-synaptic neuron 20 at a third time t3 that is delayed by a delay time td from the second time t2, which is when the row spike Rs is generated. In other words, the column pulse Cp for depressing the synapse 30a may be inputted at the third time t3 to the second electrode of the memristor 35 in the synapse 30a from the post-synaptic neuron 20. For example, the column pulse Cp may have a positive (+) voltage +Vset/2, which is equal to or larger than ½ of a set voltage Vset.

The method may further include generating a row pulse Rp for depressing the synapse 30a by the pre-synaptic neuron 10 at a fourth time t4 that is delayed by a slight delay time from the third time t3. That is, the method may include inputting the row pulse Rp for depressing the synapse 30a to the drain electrode of the transistor 31 in the synapse 30a from the pre-synaptic neuron 10 at the fourth time t4. For example, the row pulse Rp may have a negative (−) voltage −Vset/2, which has a magnitude that is equal to or larger than ½ of the set voltage Vset. Even though the row pulse Rp does not have a negative (−) voltage, if a voltage difference between the column pulse Cp and the row pulse Rp is larger than the set voltage Vset, a current may flow from the second electrode of the memristor 35 in the synapse 30a to the drain electrode of the transistor 31. Therefore, the resistance value of the memristor 35 in the synapse 30a may increase, and the synapse 30a may be depressed. As aforementioned, in some embodiments of the present disclosure, the column pulse Cp and the row pulse Rp may rise/fall and fall/rise, and may be inputted to the synapse 30a at substantially the same times.

The method may further include generating a gating pulse Gp by the gating controller 40 at a fifth time t5 after the row pulse Rp is generated at the fourth time t4, the fifth time t5 being a gating time difference $\Delta$tg from the fourth time t4, which is when the row pulse Rp is generated and inputted to the synapse 30a. Namely, the gating pulse Gp generated by the gating controller 40 may be inputted to the gate electrode of the transistor 31 in the synapse 30a through the gating line 45 at the fifth time t5. The gating time difference $\Delta$tg may be proportional to the spike time difference Ms. In the embodiment, it may be assumed that the gating pulse Gp and the column pulse Cp have the same maximum voltage level and the same rectangular shape.

If the transistor 31 is turned on as the gating pulse Gp is inputted to the gate electrode of the transistor 31, the memristor 35 in the synapse 30a may be depressed during a time period when the gating pulse Gp, the row pulse Rp, and the column pulse Cp overlap, that is, during a depression time $\Delta$tp=t6−t5, in which t6 represents a time when providing the row pulse Rp is stopped. In other words, while both the gating pulse Gp, the row pulse Rp, and the column pulse Cp are inputted to the synapse 30a, i.e., in an overlay region S of the row pulse Rp, the column pulse Cp and the gating pulse Gp, the transistor 31 is turned on, and thus the memristor 35 is depressed.

After that, if the inputting of the column pulse Cp and the row pulse Rp has ended, and thus depression of the synapse 30a is ended, the inputting of the gating pulse Gp is also ended. Thereafter, as the gating signal Gs for a next cycle is inputted at a ninth time t9 to a gate electrode of a transistor in another synapse, a ready state for potentiating or depressing the other synapse may be entered.

The above operation described with reference to FIGS. 2A and 3B may be applied to the synapse 30b illustrated in FIG. 2B when one of the row transistor 31r and the column transistor 31c receives the gating signal Gp and is turned on to depress the synapse 30b.

Figure 4A:
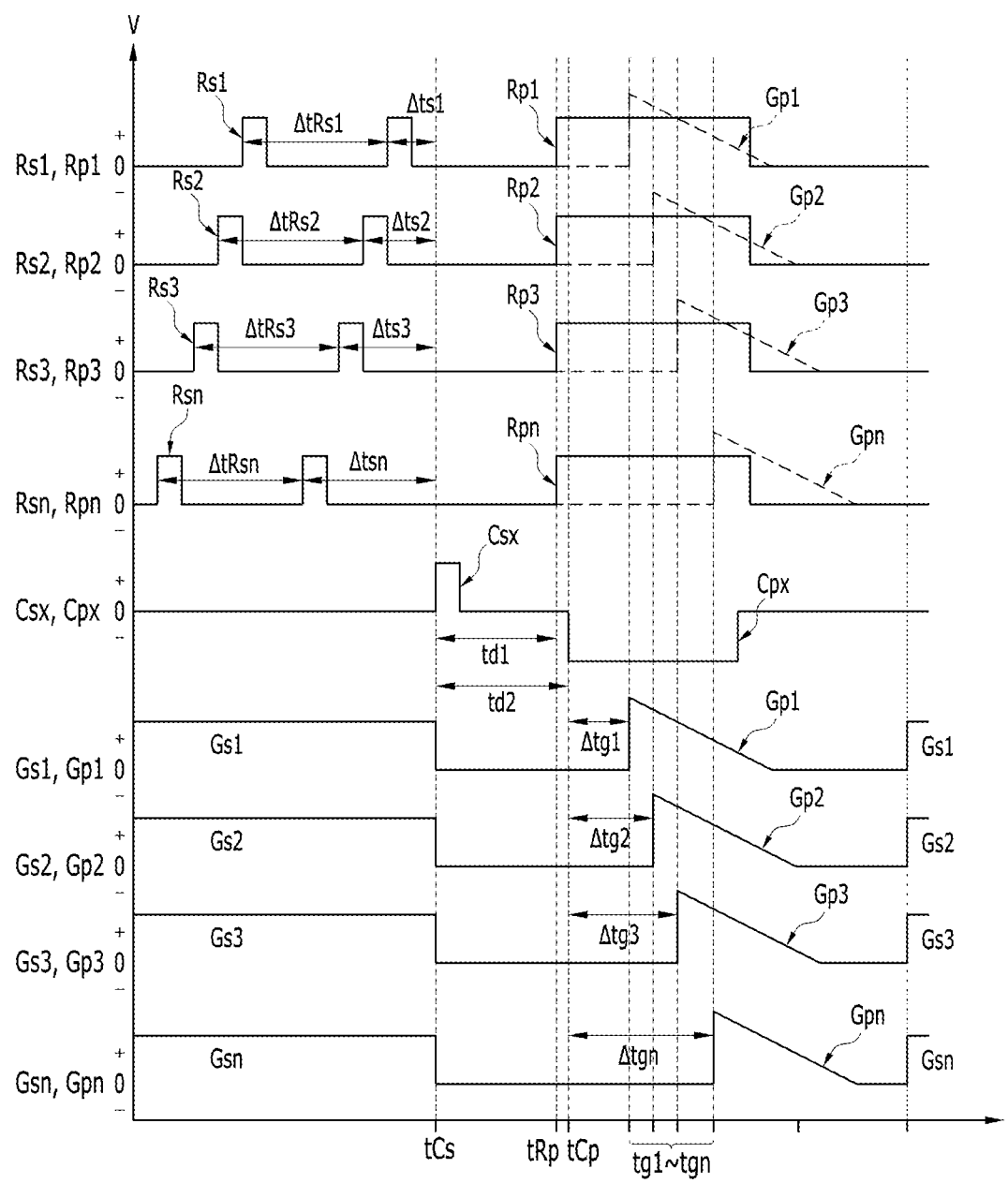
FIG. 4A is a timing diagram illustrating a method for selectively potentiating synapses of the neuromorphic device, shown in FIG. 1A or 1C, in column units.
Figure 4B:
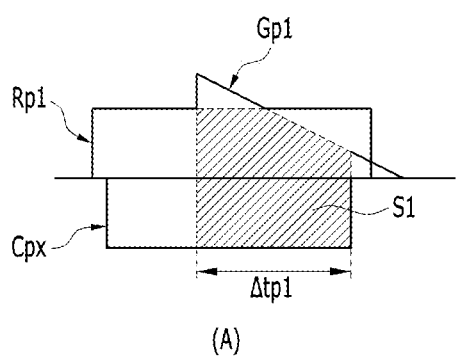
FIG. 4B illustrates a timing diagram of overlapping pulses.
Figure 4B:
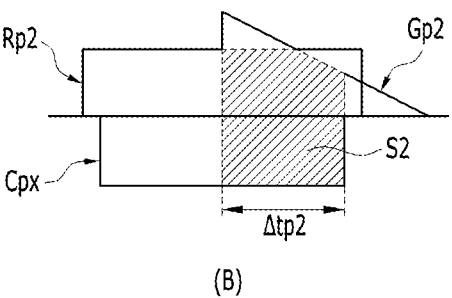
Figure 4B:
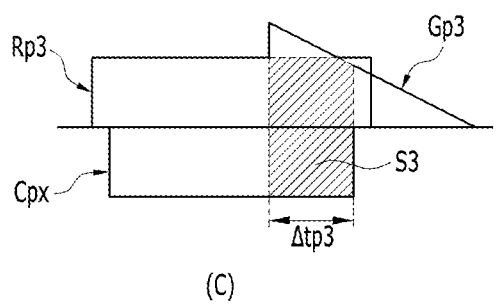
Figure 4B:
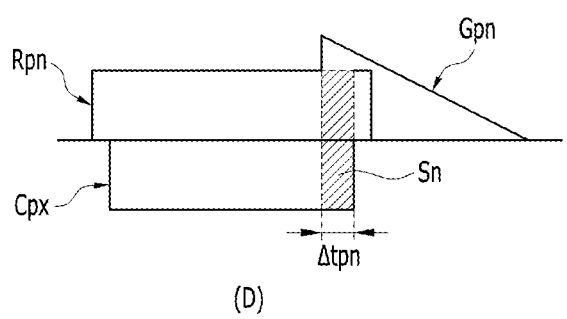

FIG. 4A is a timing diagram illustrating a method for selectively potentiating the synapses 30_11 to 30_nn of the neuromorphic device, shown in FIG. 1A or 1C, in column units, and FIG. 4B illustrates a timing diagram of overlapping pulses.

Referring to FIG. 4A, the method for selectively potentiating the synapses 30_11 to 30_nn of the neuromorphic device in column units may include inputting row spikes Rs1 to Rsn, generated by the respective pre-synaptic neurons 10_1 to 10_n, to drain electrodes of transistors 31_11 to 31_nn in the synapses 30_11 to 30_nn while gating signals Gs1 to Gsn generated by the row gating controllers 41_1 to 41_n are inputted to gate electrodes of the transistors 31_11 to 31_nn in the respective synapses 30_11 to 30_nn.

The post-synaptic neuron 20_x may be fired as the row spikes Rs1 to Rsn are accumulated in the synapses 30_1x to 30_nx and resultant total current from the synapses 30_1x to 30_nx are accumulated in an integrator in the post-synaptic neuron 20_x, x being in a range of 1 to n. The fired post-synaptic neuron 20_x may be one among the plurality of post-synaptic neurons 20_1 to 20_n shown in FIG. 1A or 1C. When a voltage/current that is accumulated in the integrator in the post-synaptic neuron 20_x becomes larger than a reference voltage of the comparator 22_x, the post-synaptic neuron 20_x is fired.

When referring back to FIG. 1A or 1C, if one post-synaptic neuron 20_x is first fired, that is, a column spike Csx is generated by the post-synaptic neuron 20_x, the remaining post-synaptic neurons among the post-synaptic neurons 20_1 to 20_n may not be fired anymore. That is, the winner-takes-all rule may be applied. Further, the row spikes Rs1 to Rsn may not be generated anymore by the pre-synaptic neurons 10_1 to 10_n.

Generation cycles $\Delta$tRs1 to $\Delta$tRsn of the respective row spikes Rs1 to Rsn may be different from one another. The generation cycles $\Delta$tRs1 to $\Delta$tRsn of the respective row spikes Rs1 to Rsn may be respectively longer than spike generation time differences $\Delta$ts1 to $\Delta$tsn, which extend between generation times of the final row spikes of the respective row spikes Rs1 to Rsn and a generation time tCs of the column spike Csx.

If the column spike Csx is generated, generating and inputting the gating signals Gs1 to Gsn to the gate electrodes of the transistors 31_11 to 31_nn may be stopped. Namely, the transistors 31_11 to 31_nn in the respective synapses 30_11 to 30_nn may be turned off. After that, row pulses Rp1 to Rpn may be generated at a time tRp that is delayed by a first delay time td1 from the time tCs when the column spike Csx is generated, and a column pulse Cpx may be generated at a time tCp that is delayed by a second delay time td2 from the time tCs. In this embodiment, the first delay time td1 is shorter than the second delay time td2. That is, the time tRp when the row pulses Rp1 to Rpn are generated is earlier than the time tCp when the column pulse Cpx is generated.

In an embodiment, the row pulses Rp1 to Rpn may be generated at substantially the same time tRp. In other embodiments of the present disclosure, the time tCp when the column pulse Cpx is generated may be earlier than the time tRp when the row pulses Rp1 to Rpn are generated, or the time tRp when the row pulses Rp1 to Rpn are generated and the timing tCp when the column pulse Cpx is generated may be substantially the same.

The row pulses Rp1 to Rpn may be inputted to the drain electrodes of the transistors 31_11 to 31_nn of the respective synapses 30_11 to 30_nn from the pre-synaptic neurons 10_1 to 10_n, and the column pulse Cpx generated by the fired post-synaptic neuron 20_x may be inputted to second electrodes of memristors 35_1x to 35_nx in the respective synapses 30_1x to 30_nx coupled to the column line 25_x. At this time, the transistors 31_1x to 31_nx of the respective synapses 30_1x to 30_nx may not be turned on yet, since generating and inputting the gating signals Gs1 to Gsn to the gate electrodes of the transistors 31_11 to 31_nn may be stopped from the time tCs.

After that, gating pulses Gp1 to Gpn may be generated from the respective row gating controllers 41_1 to 41_n according to gating time differences Δtg1 to Δtgn, which are proportional to the respective spike time differences Δts1 to Δtsn. In an embodiment, the gating time differences Δtg1 to Δtgn may be longer when the respective corresponding spike time differences Δts1 to Δtsn are longer, and may be shorter when the respective corresponding spike time differences Δts1 to Δtsn are shorter.

Referring to FIGS. 1A and 4A, the gating pulse Gp1 may be inputted first to the synapses 30_11 to 30_1n which correspond to the shortest spike time difference Δts1. The gating pulse Gpn may be inputted last to the synapses 30_n1 to 30_nn which correspond to the longest spike time difference Δtsn. The respective gating pulses Gp1 to Gpn may be generated by the respective row gating controllers 41_1 to 41_n, and may be inputted to the gate electrodes of the transistors 31_1n to 31_nn of the respective synapses 30_1n to 30_nn through the respective row gating lines 46_1 to 46_n, at the respective times tg1 to tgn. For example, the gating pulse Gp1 generated by the row gating controllers 41_1 is inputted, at the time tg1, to the gate electrodes of the transistors 31_11 to 31_1n of the synapses 30_11 to 30_1n through the row gating line 46_1. The gating pulse Gpn generated by the row gating controllers 41_n is inputted, at the time tgn, to the gate electrodes of the transistors 31_n1 to 31_nn of the synapses 30_n1 to 30_nn through the row gating line 46_n. The time tgn is later than the time tg1.

As the gating pulses Gp1, Gp2, Gp3, . . . , Gpn are sequentially inputted to the gate electrodes of the transistors 31_11 to 31_nn, the transistors 31_1x to 31_nx may be turned on sequentially. Accordingly, the respective synapses 30_1x to 30_nx may be potentiated sequentially. The memristors 35_1x to 35_nx of the respective synapses 30_1x to 30_nx may be potentiated during regions S1 to Sn, shown in FIG. 4B, where overlays of the respective row pulses Rp1 to Rpn and the column pulse Cpx overlap the respective gating pulses Gp1 to Gpn.

In embodiments of the present disclosure, it may be assumed that each of the gating pulses Gp1 to Gpn has a rectangular shape. In some other embodiments of the present disclosure, each of the gate pulses Gp1 to Gpn may have a triangular shape.

In FIG. 4B, the regions S1 to Sn where the overlays of the respective row pulses Rp1 to Rpn and the column pulse Cpx overlap the respective gating pulses Gp1 to Gpn are hatched. The hatched regions S1 to Sn may be overlapping integration values of the row pulses Rp1 to Rpn, the column pulse Cpx, and the gating pulses Gp1 to Gpn.

Referring to FIG. 4B, it may be seen that areas, where the overlays of the row pulses Rp1 to Rpn and the column pulse Cpx overlap the gating pulses Gp1 to Gpn, vary according to the gating time differences Δtg1 to Δtgn. That is, it may be seen that degrees by which the respective synapses 30_1x to 30_nx are potentiated may vary according to the gating time differences Δtg1 to Δtgn. In detail, as the gating pulse Gp1 is generated with the shortest gating time difference Δtg1 corresponding to the shortest spike time difference Δts1, the corresponding synapse 30_1x may be potentiated for the longest time difference Δtp1. As the gating pulse Gpn is generated with the longest gating time difference Δtgn corresponding to the longest spike time difference Δtsn, the corresponding synapse 30_nx may be potentiated for the shortest time difference Δtpn. Referring to FIGS. 4A and 4B, as a gating time difference Δtg becomes larger, a size of a region where an overlay of a row pulse Rp and a column pulse Cp overlaps a gating pulse Gp becomes smaller.

In addition, since each of the gating pulses Gp1 to Gpn has a triangular shape, a potentiation ration differences of the synapses 30_1x to 30_nx according to the spike time differences Δts1 to Δtsn and the gating time differences Δtg1 to Δtgn may become larger than the case in which each of the gating pulses Gp1 to Gpn has a rectangular shape. According to the embodiment of the present disclosure, potentiation ratios of the synapses 30_1x to 30_nx may vary according to the gating time differences Δtg1 to Δtgn, that is, the times tg1 to tgn when the gating pulses Gp1 to Gpn are generated, respectively, and the shape of the gating pulses Gp1 to Gpn.

In the present embodiment, for example, the row pulses Rp1 to Rpn may have a positive (+) voltage +Vset/2, which is equal to or larger than ½ of the set voltage Vset, and the column pulse Cpx may have a negative (−) voltage −Vset/2, which has a magnitude that is equal to or larger than ½ of the set voltage Vset.

Figure 5A:
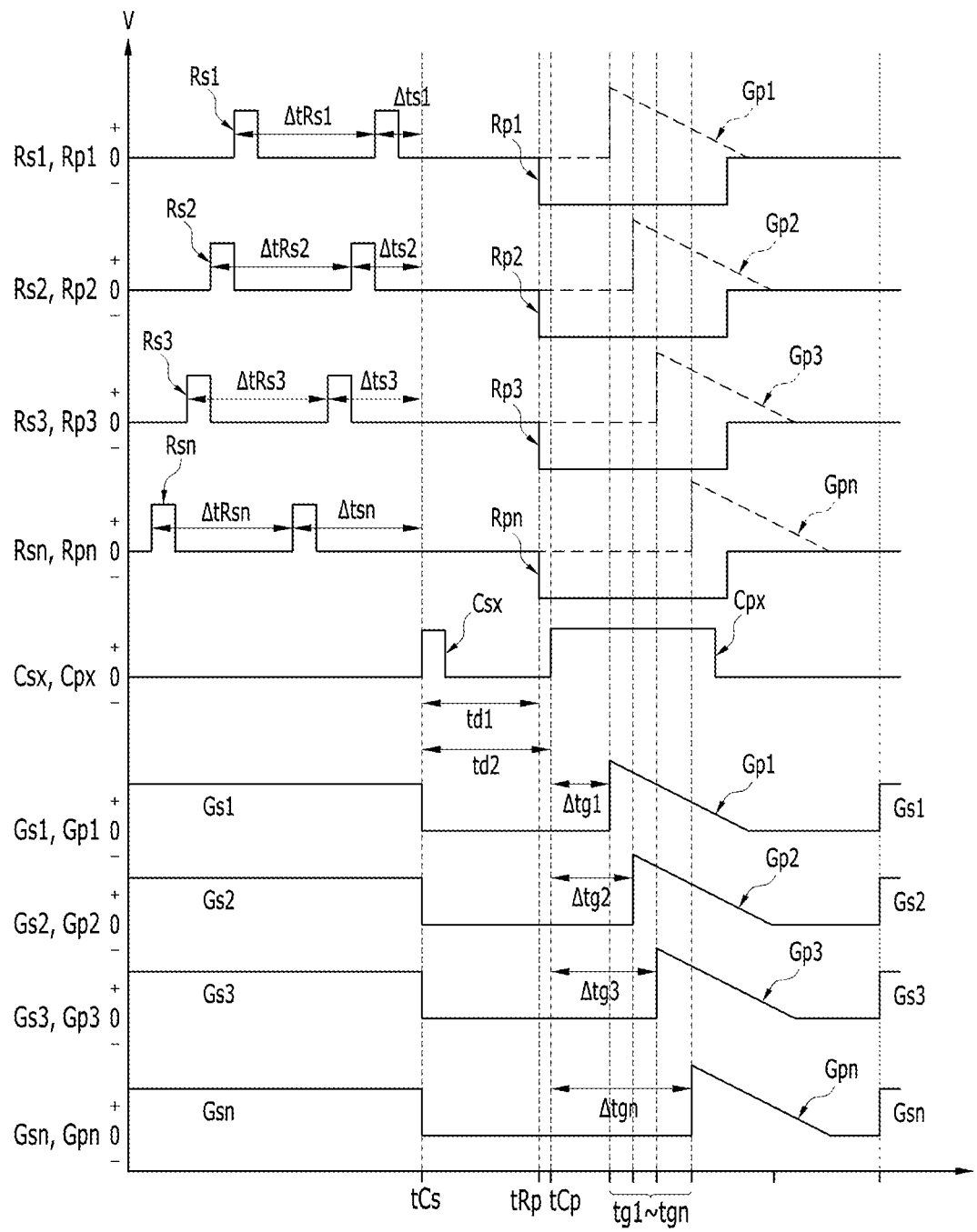
FIG. 5A is a timing diagram illustrating a method for selectively depressing the synapses of the neuromorphic devices, shown in FIG. 1A or 1C, in column units.
Figure 5B:
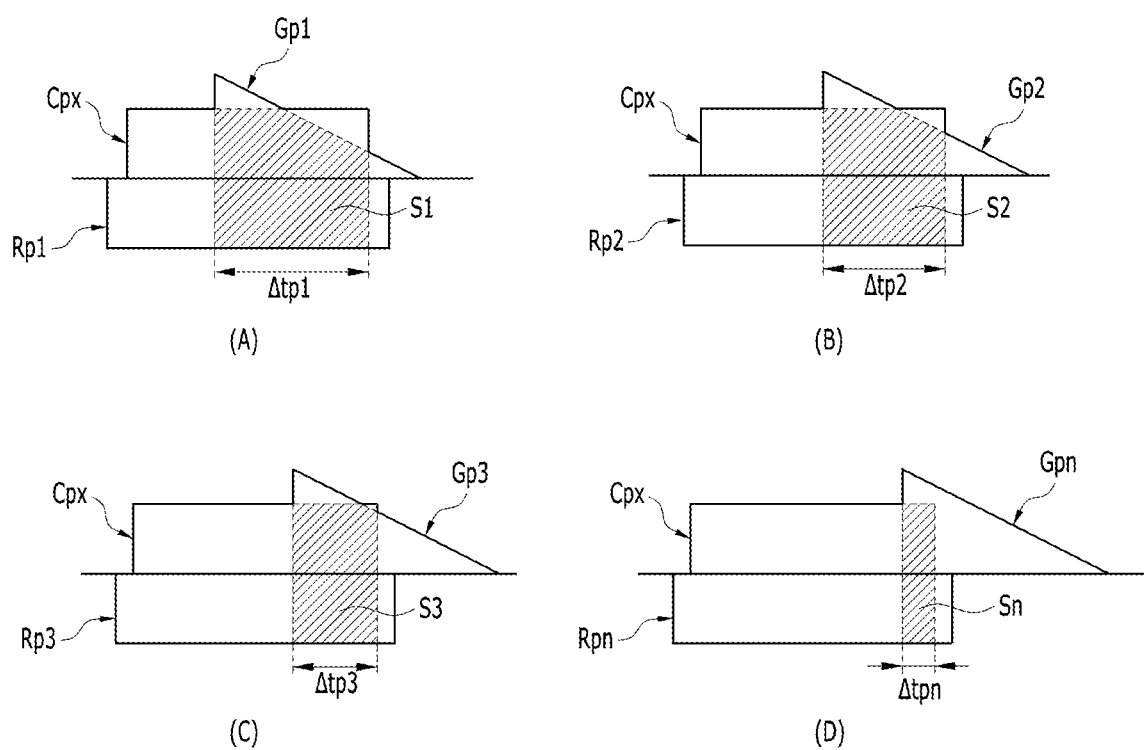
FIG. 5B illustrates a timing diagram of overlapping pulses.

FIG. 5A is a timing diagram illustrating a method for depressing the synapses 30_11 to 30_nn of the neuromorphic devices, shown in FIG. 1A or 1C, in column units, and FIG. 5B is a timing diagram of overlapping pulses. The timing diagram in FIG. 5A may be understood with reference to the description for the timing diagram FIG. 4A. However, in the embodiment shown in FIG. 5A, unlike the embodiment shown in FIG. 4A, the row pulses Rp1 to Rpn may have a negative (−) voltage −Vset/2, which has a magnitude that is equal to or smaller than ½ of the set voltage Vset, and the column pulse Cpx may have a positive (+) voltage +Vset/2, which may be equal to or larger than ½ of the set voltage Vset. Referring to FIG. 5B, the synapses 30_1x to 30_nx may be depressed in response to regions where overlays of the row pulses Rp1 to Rpn and the column pulse Cpx overlap the gating pulses Gp1 to Gpn.

Figure 6:
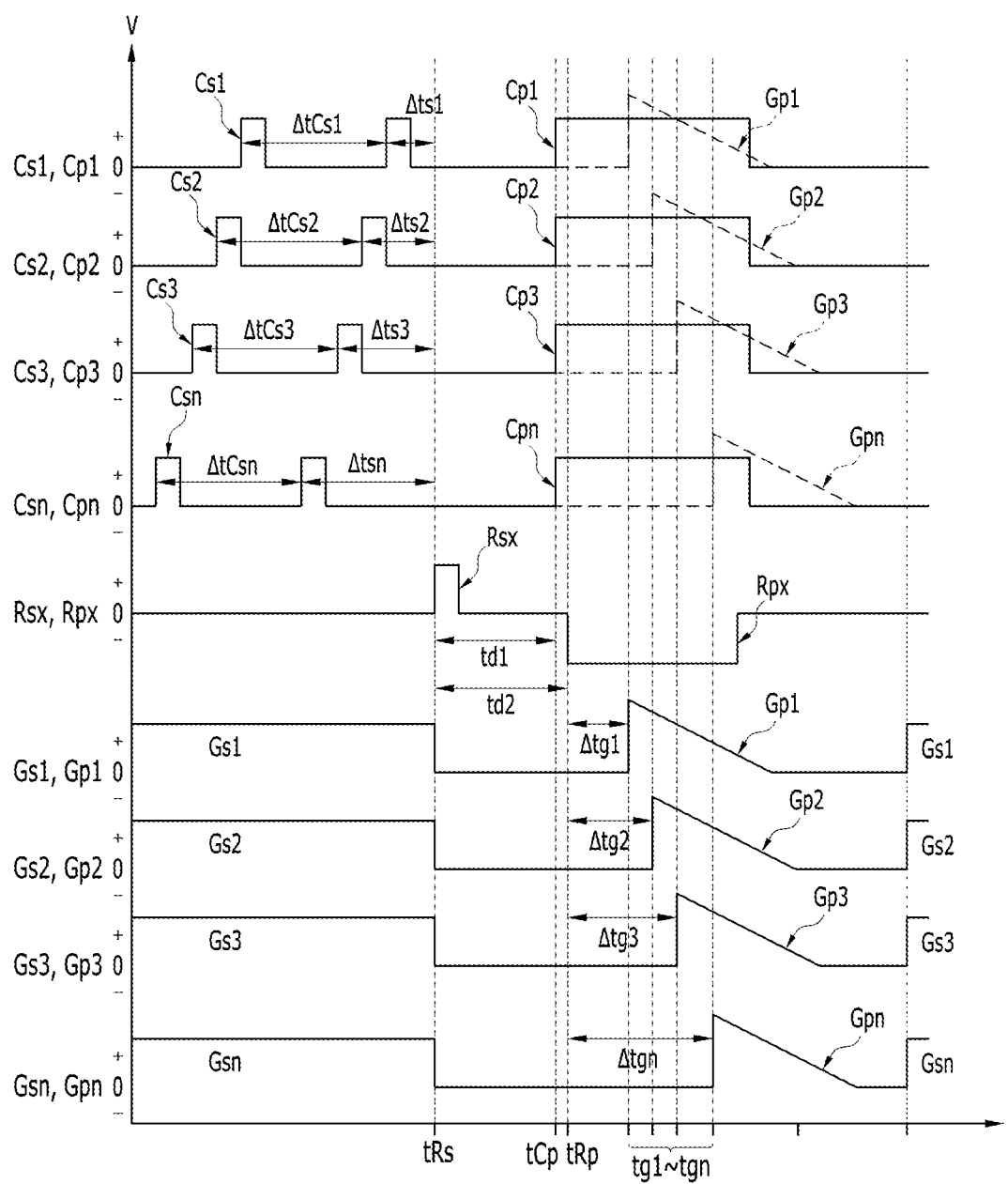
FIG. 6 is a timing diagram illustrating a method for selectively depressing synapses of the neuromorphic device, shown in FIG. 1B or 1C, in row units.

FIG. 6 is a timing diagram illustrating a method for selectively depressing synapses 30_11 to 30_nn of the neuromorphic device, shown in FIG. 1B or 1C, in row units.

Referring to FIG. 6, the method for selectively depressing the synapses 30_11 to 30_nn of the neuromorphic device may include inputting column spikes Cs1 to Csn generated by the respective post-synaptic neurons 20_1 to 20_n to the second electrodes of memristors 35_11 to 35_nn of the respective synapses 30_11 to 30_nn while gating signals Gs1 to Gsn generated by the column gating controller 42_1 to 42_n are inputted to the gate electrodes of transistors 31_11 to 31_nn of the respective synapses 30_11 to 30_nn. Generation cycles ΔtCs1 to ΔtCsn of the column spikes Cs1 to Csn may be different from one another.

While the respective column spikes Cs1 to Csn are inputted to the respective synapses 30_11 to 30_nn, a row spike Rsx may be generated by the pre-synaptic neuron 10_x, and may be inputted to the drain electrodes of the transistors 31_x1 to 31_xn of the synapses 30_x1 to 30_xn. The pre-synaptic neuron 10_x may be coupled in common to the synapses 30_x1 to 30_xn that are to be depressed.

If the row spike Rsx is generated, generating and inputting the gating signals Gs1 to Gsn may be stopped. Namely, the transistors 31_x1 to 31_xn of the synapses 30_x1 to 30_xn may be turned off. After that, column pulses Cp1 to Cpn may be generated at a time tCp that is delayed by a first delay time td1 from a time tRs when the row spike Rsx is generated, and a row pulse Rpx may be generated at a time tRp that is delayed by a second delay time td2 from the time tRs. In the embodiment shown in FIG. 7, the time tRp is later than the time tCp.

The column pulses Cp1 to Cpn may be generated by the post-synaptic neurons 20_1 to 20_n, and may be inputted to the second electrodes of the memristors 35_x1 to 35_xn of the respective synapses 30_x1 to 30_xn to be depressed, and the row pulse Rpx may be generated by the pre-synaptic neuron 10_x, and may be inputted to the drain electrodes of the transistors 31_x1 to 31_xn of the respective synapses 30_x1 to 30_xn. The column pulses Cp1 to Cpn may be generated at substantially the same time tCp. In the embodiment shown in FIG. 7, the column pulses Cp1 to Cpn may have a positive (+) voltage +Vset/2, which is equal to or larger than ½ of a set voltage Vset, and the row pulse Rpx may have a negative (−) voltage −Vset/2, which has a magnitude that is equal to or larger than ½ of the set voltage Vset. In some embodiments of the present disclosure, the row pulse Rpx may have a positive (+) voltage that is lower than voltages of the column pulses Cp1 to Cpn. At this time, the transistors 31_x1 to 31_xn of the respective synapses 30_x1 to 30_xn may not be turned on yet.

Gating pulses Gp1 to Gpn may be generated by the column gating controllers 42_1 to 42_n at respectively different times tg1 to tgn according to spike time differences Δts1 to Δtsn, which extend between generation times of the final column spikes of the respective column spikes Cs1 to Csn and a generation time of the row spike Rsx, and may be inputted to the gate electrodes of the transistors 31_x1 to 31_xn of the synapses 30_x1 to 30_xn. As aforementioned, gating time differences Δtg1 to Δtgn may be proportional to the spike time differences Δts1 to Δtsn, respectively.

By the gating pulses Gp1 to Gpn, the transistors 31_x1 to 31_xn of the synapses 30_x1 to 30_xn may be turned on, and the memristors 35_x1 to 35_xn of the respective synapses 30_x1 to 30_xn may be depressed.

After the respective synapses 30_x1 to 30_xn are depressed, gating signals Gs1 to Gsn for depressing synapses 30_y1 to 30_yn coupled to another pre-synaptic neuron 10_y may be inputted to gate electrodes of transistors 31_y1 to 31_yn of the respective synapses 30_y1 to 30_yn, in which y is in a range of 1 to n, but is different from x. As aforementioned, the gating pulses Gp1 to Gpn may have a rectangle shape or a triangle shape.

According to the embodiments of the present disclosure, the depression ratios of the synapses 30_x1 to 30_xn may vary according to the gating time differences Δtg1 to Δtgn. That is, the depression ratios may vary according to the times tg1 to tgn when the gating pulses Gp1 to Gpn are generated, and the shapes of the gating pulses Gp1 to Gpn.

In the above embodiments of the present disclosure, through the potentiating and the depressing of a synapse, a learned data pattern, i.e., a weight, of the synapse can be updated.

Figure 7:
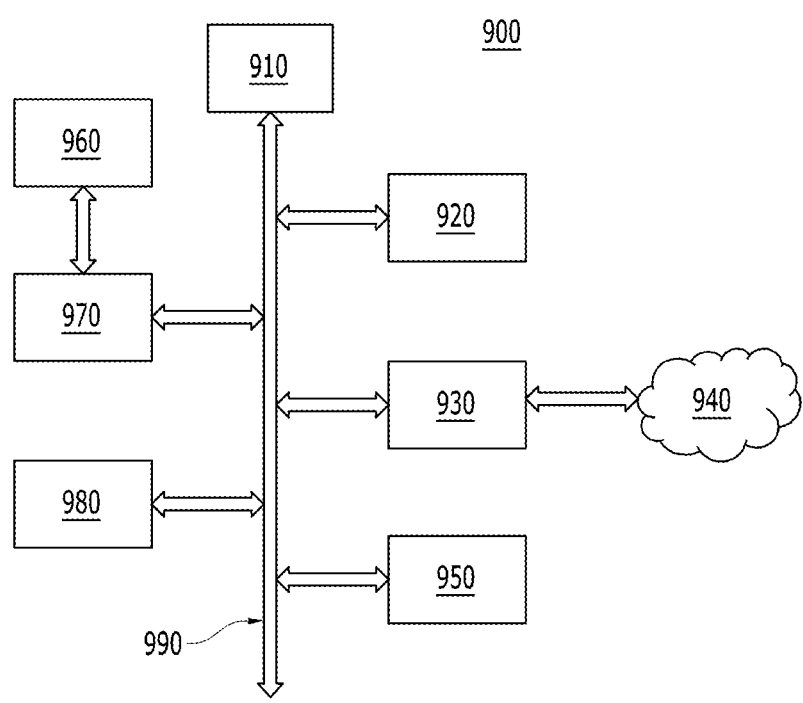
FIG. 7 is a block diagram conceptually illustrating a pattern recognition system in accordance with an embodiment of the present disclosure.

FIG. 7 is a block diagram conceptually illustrating a pattern recognition system 900 in accordance with an embodiment of the present disclosure. The pattern recognition system 900 may include one of a speech recognition system, an image recognition system, a code recognition system, a signal recognition system, and a system for recognizing various patterns.

Referring to FIG. 7, the pattern recognition system 900 in accordance with the present embodiment may include a central processing unit (CPU) 910, a memory unit 920, a communication control unit 930, a network 940, an output unit 950, an input unit 960, an analog-digital converter (ADC) 970, a neuromorphic unit 980, and a bus 990.

The CPU 910 may generate and transmit various signals for a learning process to be performed by the neuromorphic unit 980, and perform a variety of processes and functions for recognizing patterns such as voice and images according to an output of the neuromorphic unit 980. The CPU 910 may be connected to the memory unit 920, the communication control unit 930, the output unit 950, the ADC 970, and the neuromorphic unit 980 through the bus 990.

The memory unit 920 may store information in accordance with operations of the pattern recognition system 900. The memory unit 920 may include one or more of a volatile memory device such as DRAM or SRAM, a nonvolatile memory device such as PRAM, MRAM, ReRAM, or NAND flash memory, and a memory unit such as an HDD (Hard Disk Drive) or an SSD (Solid State Drive).

The communication control unit 930 may transmit and/or receive data such as a recognized voice and image to and/or from a communication control unit of another system through the network 940.

The output unit 950 may output the data such as the recognized voice and image using various methods. For example, the output unit 950 may include one or more of a speaker, a printer, a monitor, a display panel, a beam projector, a hologrammer and so on.

The input unit 960 may include one or more of a microphone, a camera, a scanner, a touch pad, a keyboard, a mouse, a mouse pen, a sensor, and so on.

The ADC 970 may convert analog data transmitted from the input unit 960 into digital data.

The neuromorphic unit 980 may perform learning and recognition using the data transmitted from the ADC 970, and output data corresponding to a recognized pattern. The neuromorphic unit 980 may include one or more of the neuromorphic devices in accordance with the various embodiments.

According to the embodiments of the present disclosure, weights of synapses may be quickly updated (potentiated or depressed) within a short time.

According to the embodiments of the present disclosure, since each of synapses has only one memristor, the occupation area of each synapse may be minimized.

According to the embodiments of the present disclosure, weights of synapses may be updated (potentiated or depressed) in a variety of ways. That is, potentiation ratios and depression ratios may be controlled in a variety of ways.

Other advantages according to various embodiments of the present disclosure have been described in the text.

Although various embodiments have been described for illustrative purposes, it will be apparent to those skilled in the art that various changes and modifications may be made without departing from the spirit and scope of the invention as defined in the following claims.

What is claimed is:

1. A method for updating a weight of a synapse of a neuromorphic device, the synapse including a transistor and a memristor, the memristor having a first electrode coupled to a source electrode of the transistor, the method comprising:

inputting a row spike to a drain electrode of the transistor at a first time;

inputting a column spike to a second electrode of the memristor at a second time;

inputting a row pulse to the drain electrode of the transistor at a third time that is delayed by a first delay time from the second time;

inputting a column pulse to the second electrode of the memristor at a fourth time that is delayed by a second delay time from the second time; and inputting a gating pulse to a gate electrode of the transistor at a fifth time that is delayed by a third delay time from the fourth time, the gating pulse changing the transistor from a turning-off state to a turning-on state at the fifth time.

2. The method according to claim 1, wherein the row spike is generated by a pre-synaptic neuron, and is inputted to the drain electrode of the transistor through a row line.

3. The method according to claim 1, wherein the column spike is generated by a post-synaptic neuron, and is inputted to the second electrode of the memristor through a column line.

4. The method according to claim 1, wherein the row pulse is generated by the pre-synaptic neuron, and is inputted to the drain electrode of the transistor through a row line.

5. The method according to claim 1, wherein the column pulse is generated by the post-synaptic neuron, and is inputted to the second electrode of the memristor through a column line.

6. The method according to claim 1, wherein the row spike and the column spike are generated while the transistor is turned on.

7. The method according to claim 1, wherein the gating pulse is generated by a gating controller, and is inputted to the gate electrode of the transistor through a gating line.

8. The method according to claim 1, wherein the updating of the weight of the synapse is performed for a time period in which an overlay of the row pulse and the column pulse overlaps the gating pulse.

9. A method for updating a weight of a synapse of a neuromorphic device, the method comprising:
inputting, by a first neuron, a first spike to a first synapse at a first time;
inputting, by a second neuron, a second spike to a second synapse at a second time that is delayed from the first time;
inputting, by a third neuron, a third spike to each of the first synapse and the second synapse at a third time;
inputting, by the first neuron, a first pulse to the first synapse at a fourth time that is delayed from the third time;
inputting, by the second neuron, a second pulse to the second synapse at a fifth time that is delayed from the third time;
inputting, by the third neuron, a third pulse to each of the first synapse and the second synapse at a sixth time;
inputting a first gating pulse to a first transistor of the first synapse at a seventh time that is delayed from the sixth time, the first gating pulse changing the first transistor from a turning-off state to a turning-on state at the seventh time; and
inputting a second gating pulse to a second transistor of the second synapse at an eighth time that is delayed from the sixth time, the second gating pulse changing the second transistor from a turning-off state to a turning-on state at the eighth time.

10. The method according to claim 9, wherein, if a first spike time difference from the first time to the third time is shorter than a second spike time difference from the second time to the third time, a first gating time difference from the sixth time to the seventh time is shorter than a second gating time difference from the sixth time to the eight time.

11. The method according to claim 10, wherein, if the first gating time difference is shorter than the second gating time difference, a weight of the first synapse is updated over a longer time period than a weight of the second synapse.

12. The method according to claim 9,
wherein the first synapse includes the first transistor and a first memristor, the first memristor having a first electrode coupled to a source electrode of the first transistor,
wherein the second synapse includes the second transistor and a second memristor, the second memristor having a first electrode coupled to a source electrode of the second transistor,
wherein the first neuron is coupled to a drain electrode of the first transistor,
wherein the second neuron is coupled to a drain electrode of the second transistor, and
wherein the third neuron is coupled to a second electrode of the first memristor and a second electrode of the second memristor.

13. The method according to claim 12,
wherein the first gating pulse is generated by a first gating controller that is coupled to a gate electrode of the first transistor, and
wherein the second gating pulse is generated by a second gating controller that is coupled to a gate electrode of the second transistor.

14. The method according to claim 9, wherein the first and second neurons are first and second pre-synaptic neurons, and the third neuron is a post-synaptic neuron, and
wherein the first and second synapses are coupled in common to the post-synaptic neuron.

15. The method according to claim 9, wherein the first and second neurons are first and second post-synaptic neurons, and the third neuron is a pre-synaptic neuron, and
wherein the first and second synapses are coupled in common to the pre-synaptic neuron.

16. A method for updating weights of first and second synapses of a neuromorphic device, the first synapse including a first transistor and a first memristor, the first memristor having a first electrode coupled to a source electrode of the first transistor, the second synapse including a second transistor and a second memristor, the second memristor having a first electrode coupled to a source electrode of the second transistor, the method comprising:
turning on the first transistor and the second transistor by inputting a first gating signal to a gate electrode of the first transistor and inputting a second gating signal to a gate electrode of the second transistor, the first gating signal being generated by a first gating controller, the second gating signal being generated by a second gating controller;
inputting a first row spike to a drain electrode of the first transistor of the first synapse through a first row line, and inputting a second row spike to a drain electrode of the second transistor of the second synapse through a second row line, the first row spike being generated by a first pre-synaptic neuron coupled to the first synapse, the second row spike being generated by a second pre-synaptic neuron coupled to the second synapse;
inputting a column spike generated by a post-synaptic neuron, which is coupled in common to the first synapse and the second synapse, to a second electrode of the first memristor and a second electrode of the second memristor through a column line;
stopping the first and second gating signals from being input to thereby turn off the first transistor and the second transistor;
inputting a first row pulse to the drain electrode of the first transistor and inputting a second row pulse to the drain electrode of the second transistor, the first row pulse being generated by the first pre-synaptic neuron, the second row pulse being generated by the second pre-synaptic neuron;

inputting a column pulse to the second electrode of the first memristor and the second electrode of the second memristor, the column pulse being generated by the post-synaptic neuron; and inputting a first gating pulse to the gate electrode of the first transistor and inputting a second gating pulse to the gate electrode of the second transistor such that the first and second transistors are turned on in response to the first and second gating pulses, respectively, the first gating pulse being generated by the first gating controller, the second gating pulse being generated by the second gating controller.

17. The method according to claim 16, wherein, if a first spike time difference from a time when the first row spike is generated to a time when the column spike is generated is shorter than a second spike time difference from a time when the second row spike is generated to the time when the column spike is generated, a first gating time difference from a time when the column pulse is generated to a time when the first gating pulse is generated is shorter than a second gating time difference from the time when the column pulse is generated to a time when the second gating pulse is generated.

18. The method according to claim 17, wherein, if the first spike time difference is longer than the second spike time difference, the first gating time difference is longer than the second gating time difference.

19. The method according to claim 16, wherein the column pulse has a negative (−) voltage when the first and second row pulses have a positive (+) voltage.

20. The method according to claim 16, wherein the column pulse has a positive (+) voltage when the first and second row pulses have a negative (−) voltage.

* * * * *